United States Patent
Dijkhuizen et al.

(10) Patent No.: US 9,876,358 B2
(45) Date of Patent: Jan. 23, 2018

(54) CONVERTER ARRANGEMENT FOR POWER COMPENSATION AND A METHOD FOR CONTROLLING A POWER CONVERTER

(71) Applicant: ABB Technology Ltd, Zürich (CH)

(72) Inventors: Frans Dijkhuizen, Skultuna (SE); Alireza Nami, Västerås (SE); Hector Zelaya De La Parra, Västerås (SE); Christopher Townsend, Newcastle (AU)

(73) Assignee: ABB SCHWEIZ AG, Baden (CH)

( * ) Notice: Subject to any disclaimer, the term of this patent is extended or adjusted under 35 U.S.C. 154(b) by 182 days.

(21) Appl. No.: 14/895,112

(22) PCT Filed: Jun. 7, 2013

(86) PCT No.: PCT/EP2013/061843
§ 371 (c)(1),
(2) Date: Dec. 1, 2015

(87) PCT Pub. No.: WO2014/194968
PCT Pub. Date: Dec. 11, 2014

(65) Prior Publication Data
US 2016/0126737 A1     May 5, 2016

(51) Int. Cl.
*H02J 3/32* (2006.01)
*H02J 3/18* (2006.01)
*H02M 7/483* (2007.01)

(52) U.S. Cl.
CPC .............. *H02J 3/18* (2013.01); *H02J 3/1857* (2013.01); *H02J 3/32* (2013.01); *H02M 2007/4835* (2013.01); *Y02E 40/26* (2013.01)

(58) Field of Classification Search
CPC ............... H02J 3/18; H02J 3/1857; H02J 3/32
USPC ........ 307/43–46; 363/137, 125, 123, 60, 53, 363/40
See application file for complete search history.

(56) References Cited

U.S. PATENT DOCUMENTS 5,642,275 A * 6/1997 Peng ........................ H02M 7/49
                                                                     363/137
5,673,189 A * 9/1997 Schettler ............... H02J 3/1857
                                                                     323/207

(Continued)

FOREIGN PATENT DOCUMENTS

| CN | 101345422 A | 1/2009 |
| CN | 101574935 A | 11/2009 |
| CN | 101588073 A | 11/2009 |

(Continued)

*Primary Examiner* — Thomas Skibinski
(74) *Attorney, Agent, or Firm* — Birch, Stewart, Kolasch & Birch, LLP (57) ABSTRACT

A converter arrangement and a method of controlling a three-phase converter arrangement connected to a transmission grid are provided. The converter arrangement includes three phase legs and an energy transfer circuit. The method includes providing a varying respective output phase voltage to the transmission grid by selecting energy storage elements of both the phase legs and the energy transfer circuit and connecting the selected energy storage elements to the transmission grid output. The method further includes selecting energy storage elements for performing a transfer of energy between the energy storage elements during the control period.

20 Claims, 9 Drawing Sheets

(56) References Cited

U.S. PATENT DOCUMENTS

2010/0060235 A1 3/2010 Dommaschk et al.
2012/0161858 A1 6/2012 Permuy et al.

FOREIGN PATENT DOCUMENTS

| DE | 195 35 552 A1 | 4/1996 |
| DE | 101 03 031 A1 | 7/2002 |
| WO | WO 02/063758 A1 | 8/2002 |
| WO | WO 2008/086760 A1 | 7/2008 |

* cited by examiner

CONVERTER ARRANGEMENT FOR POWER COMPENSATION AND A METHOD FOR CONTROLLING A POWER CONVERTER

TECHNICAL FIELD

The invention relates to power converters used in electrical power systems, which power converters include series connected switching cells having semiconductor switches and energy storage elements, such as capacitors. Especially, the invention relates to power converters used for power compensation in three phase AC transmission networks.

BACKGROUND

The invention relates to the field of voltage source converters, such as multilevel converters. Voltage source converters (VSC) have changed power transmission and distribution and using power electronics including semiconductor switching elements that can be turned off, such as IGBTs (Insulated Gate Bipolar Transistors) have found great use for DC transmission, reactive power compensation, control of active as well as reactive power, being able to create AC voltage out of DC voltage by means of switching control, and for converting AC to DC etcetera.

The multilevel converter technique, employing switching cells having respective energy storage elements for providing many voltage levels, wherein each voltage level being individually switched, can be used to compensate for example for reactive power in AC transmission networks. Often, the energy storage elements used consists of capacitors but may also be batteries.

The chain link H-bridge is a successful topology in the market and it is provided by several manufacturers. The H-bridge cells can be comparably simple and are suitable for being provided as modules, which helps to keep the costs of the construction down. Since the number of modules or switching cells is proportional to the AC voltage the system is easily scalable. Several variants of the chain-link topology exist, such as wye- or delta-connected H-bridge, and wye-connected M2LC.

Figure 9:
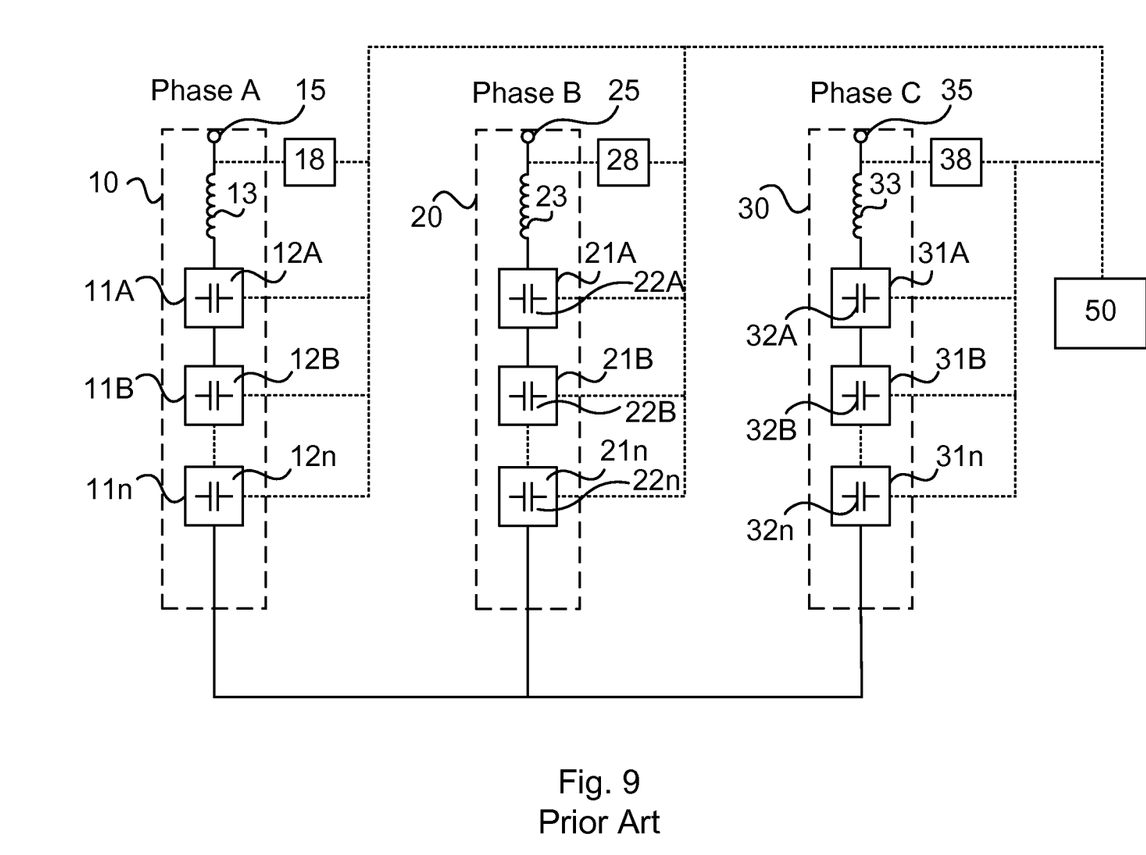
FIG. 9 illustrates a converter arrangement according to the prior art.

FIG. 9 is a simplified example of a multilevel H-bridge converter according to the prior art, which converter is wye connected. The multilevel converter arrangement comprising three phase legs 10, 20, 30, each having a connection 15, 25, 35, respectively, adapted for connecting the converter arrangement to a respective phase A, B, C of a three-phase AC power transmissions grid, which transmission grid connection 15, 25, 35 is provided at a first end of each phase leg 10, 20, 30. A coil 13, 23, 33 is arranged at the transmission grid connections to smoothen the wave forms created by the converter. At the second end of each phase leg 10, 20, 30, the phase legs 10, 20, 30 are interconnected in the wye connection. Each phase leg 10, 20, 30 comprises a number of series connected switching cells 11A-n, 21A-n, and 31A-n. Each switching cell 11A-n, 21A-n, and 31A-n comprises an energy storage element 12A-n, 22A-n, 32A-n in the form of a capacitor. Each switching cell 11A-n, 21A-n, and 31A-n of the phase legs 10, 20, 30 are provided as modules of the same type as every other switching cell 11A-n, 21A-n, 31A-n; having the same bridge topology, the same type of capacitor and the same type of semiconductor switches. The multilevel converter also includes a controller 50 arranged for monitoring currents and voltages and controlling switching of the switching cells 11A-n, 21A-n, 31A-n. The controller 50 is provided to control the switching cells 11A-n, 21A-n, 31A-n to adjust the active and reactive power in a transmission line or grid. The controller 50 controls the switching cells 11A-n, 21A-n, 31A-n for control periods at a switching frequency that is substantially higher than the transmission grid frequency. Each phase voltage is adjusted for each control period, wherein the phase voltage is adjusted in accordance with a voltage reference signal that the converter receives as input from an outer controller provided in the transmission grid. The phase legs 10, 20, 30 may become unbalanced such that the voltages of some, or all, of the capacitors (energy storage elements 12A-n, 21A-n and 31A-n) deviate from the desired nominal cell voltages.

Cost and losses for such and similar converters are related to the total silicon area used in the converter. The silicon area is dependent on the voltage and current rating. A problem that may arise is that voltages over individual energy storage elements become too large or too low. Also, the total voltage available in the cells of a phase leg may for example become too low. For normal operation of the converter in industrial applications the designer must take into account the unbalance in the three-phase load. Unbalanced loads produce negative sequence currents that need to be compensated by the converter. To counteract the effect of these currents the total number of series connected cells will have too be large enough to compensate for the unbalanced condition due to the zero sequence voltage that needs to be injected. This has lead to the need for over-rated converters, wherein a number of extra switching cells has to be included in the phase legs for redundancy.

Using more switching cells is disadvantageous since the extra switching cells add to the costs of the converters and add losses during use of the converters.

SUMMARY

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

It is an object of the invention to overcome the drawbacks of the prior art.

For this purpose the invention provides a method for controlling a three-phase converter arrangement connected to a transmission grid. The converter arrangement comprises three phase legs and an energy transfer circuit. Each phase leg comprising a plurality of switching cells arranged in series, and each switching cell comprises an energy storage element that is being selectively connectable to the respective phase leg. The energy transfer circuit comprises at least one energy storage element that is selectively connectable to each one of the phase legs. The method comprises providing a varying respective output phase voltage to the transmission grid by selecting energy storage elements and connecting the selected energy storage elements to the output for a number of successive control periods on the basis of a voltage reference signal, wherein the selecting is performed for each control period to provide an adjustment of the output phase voltages for each control period, and the selecting for each phase voltage being made among the energy storage elements of the corresponding phase leg and the at least one energy storage element of the energy transfer circuit. The method further comprises selecting energy storage elements for performing a transfer of energy in each phase leg between the energy storage elements during the control period, wherein the selection for performing the energy transfer for each phase leg is made among the energy storage elements of that phase leg and of the energy transfer circuit. Especially, the selection of energy storage element for the energy transfer in a specific phase leg is made among those energy storage elements not selected for providing the output phase voltage.

Preferably, each phase leg has an output connected to the transmission grid in one end, and preferably each phase leg has a connection to the energy transfer circuit at the opposite end.

Preferably, the switching cells are arranged in series between the first and the second end.

In an embodiment the method further includes monitoring the voltage levels of each energy storage elements and the selecting of energy storage elements for the energy transfer being based on their voltage levels.

In an embodiment the selecting for providing the output phase voltages being based on the monitored voltage levels.

In an embodiment the selecting of energy storage elements for energy transfer in each phase leg includes matching the energy storage elements on the basis of their voltage levels to provide a zero voltage contribution during the control period to the outputted phase voltage from the energy storage elements that are selected for the energy transfer.

In an embodiment, said matching includes selecting a fraction of the control period for the connection of at least one of the selected energy storage elements so that the voltage levels are equalized. In an embodiment, said fraction of the control period is equal to the fraction of the desired voltage level in relation to the voltage level of the at least one of the selected energy storage elements. Thus if for example 95% of the voltage of an energy storage element, e.g. a capacitor, is desired (i.e. needed for providing a zero total contribution to the phase voltage), the connection period for the capacitor is selected to be 95% of the control period.

In an embodiment the selection for performing the energy transfer is made among those energy storage elements that are not selected to provide the respective output phase voltages during the control period.

In an embodiment, the method further includes receiving a voltage reference signal indicating an output voltage level for each phase for each the control period, the selecting for providing the output phase voltages being based on the voltage reference signal.

In an embodiment the converter arrangement comprises an energy storage circuit comprises a plurality of energy storage elements, and the method further includes restricting the possibility to select at least one of the energy storage elements of the energy storage for at least one phase during the control period when selecting energy storage elements for providing each output phase voltage and when selecting energy storage elements for energy transfer. Preferably, a selection of which energy storage elements of the energy transfer circuit that should be available during the control period for each phase leg is performed for each respective phase leg. Preferably also, when restricting the use of one or more energy storage elements, the phase leg having the lowest phase voltage during the control period, i.e. having the lowest phase voltage as provided in the voltage reference signal of the control period, is restricted to use fewer energy storage elements of the energy transfer circuit than the other phase legs. Thus, the number of available energy storage elements varies for the phase legs.

Such a restriction makes it possible to provide converters having a limited number of energy storage elements in the energy transfer circuit, and thus provides an economic advantage compared to circuits dimensioned to provide the maximum phase voltage for every phase in every control period.

The invention also provides a converter arrangement for a three-phase transmission grid comprising three phase legs. Each phase leg comprising a plurality of switching cells connected in series, each switching cell comprising an energy storage element and semiconductor switches arranged to selectively connect the energy storage elements to the respective phase of the AC transmission grid. The converter is adapted to provide a voltage to each phase of the transmission grid at a respective reference voltage level for successive control periods, wherein the voltage applied being provided by combining a number of energy storage elements during each control period to synthesize each phase voltage at the respective reference voltage level. The voltage reference specifies a single voltage level for each phase during each of the control periods. Especially the converter arrangement further comprises an energy transfer circuit comprising at least one energy storage element and comprising a first, a second and a third phase connection, each being connected to a respective one of the three phase legs. The energy transfer circuit is arranged to selectively transfer electrical energy between each of the three phase legs and the energy storage. For each phase, the converter is adapted to select among the energy storage elements of the energy transfer circuit as well as those of the phase leg when providing the phase voltages.

The converter is further adapted to transfer energy between energy storage elements of each phase leg and the at least one energy storage element of the energy transfer circuit during selected control periods, which energy storage elements are selected among those energy storage elements that remain after the selection of energy storage element to provide the respective phase voltage. The transfer includes performing a matching among the remaining energy storage elements, and connecting the energy storage elements in selected directions, so that the energy storage elements selected for the energy transfer provides a total voltage output to each phase at an essentially zero voltage level for the selected control periods.

Preferably, each switching cell comprises an energy storage element, preferably a capacitor, arranged with the switches in a bridge configuration, such as an H-bridge or half H-bridge.

In an embodiment, each phase leg comprises a first end and a second end, the second end being opposite to the first end, and comprising a grid connection at the first end and a connection to the energy transfer circuit at the second end.

In an embodiment, the energy transfer circuit comprises one capacitor and three sets of two switches, each set of switches being connected to the capacitor and a respective phase leg, and arranged to selectively connect the respective phase leg to the capacitor.

In an embodiment, the energy transfer circuit comprises three H-bridge switching cells, each one connected to a respective one of the phase legs, and wherein the capacitors of the three H-bridge switching cells are interconnected by means of a DC link on both sides. Especially, one DC link interconnecting the low voltage side of the capacitors and one DC link interconnecting the high voltage side of the capacitors.

In an embodiment, each side of the capacitor of each switching cell are connected to a corresponding side of the capacitors of the other switching cells.

In an embodiment, the energy transfer circuit is arranged in a delta configuration comprising three delta connections between each pair of the phase legs.

In an embodiment each delta connection comprises at least one energy storage element and switching means for selectively connecting the energy storage element to the delta connection. Especially each delta connection comprises energy storage elements and the switching means being arranged in an H-bridge.

In an embodiment, the energy transfer circuit comprises an M2LC converter topology. In an embodiment, the phase connection of each phase leg comprises a transformer, each phase leg connected directly to a first winding of the transformer, each phase leg connected at its other end to the first winding of the transformer via the energy transfer circuit, the second winding of the transformer being arranged for connection to the transmission grid.

In an embodiment, each phase leg consists of a first and a second sub-leg, wherein the energy transfer circuit is connected to one respective end of the second sub-legs, the converter arrangement further includes a second energy transfer circuit connected to a respective end of the first sub-legs, each sub-leg being connected via the respective energy transfer circuit to a first winding of a respective transformer that provides a phase connection for each sub-leg, the second winding of the two sub-leg transformers of each phase leg being serially connected and forms a connection for a respective phase of the transmission grid.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
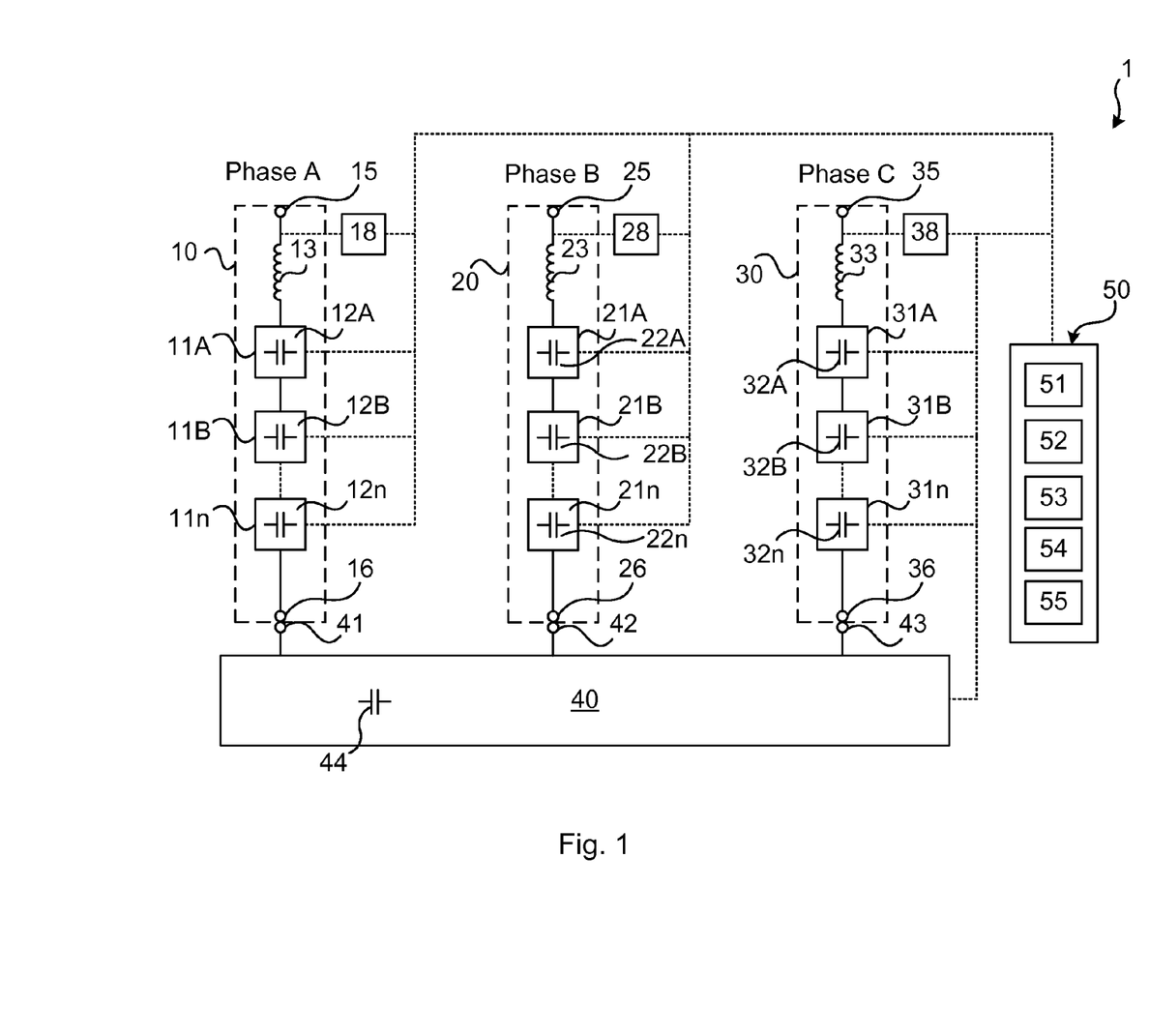
FIG. 1 illustrates a converter arrangement in accordance with the invention.

FIG. 1 illustrates a multilevel converter arrangement 1 comprising three phase legs 10, 20, 30, each having a connection 15, 25, 35, respectively, adapted for connecting the converter arrangement 1 to a respective phase A, B, C of a three-phase AC power transmissions grid, which transmission grid connection 15, 25, 35 is provided at a first end of each phase leg 10, 20, 30. Each phase leg 10, 20, 30 comprises a number of series connected switching cells 11A-n, 21A-n, and 31A-n, respectively. There are an equal number of switching cells 11A-n, 21A-n, and 31A-n in all phase legs 10, 20, 30. Each switching cell 11A-n, 21A-n, and 31A-n comprises an energy storage element in the form of a capacitor 12A-n, 22A-n, 32A-n. Preferably, each one of the capacitors 12A-n, 22A-n, 32A-n have the same capacitance value, and are provided for the same voltage level.

Even though capacitors of the same type having the same capacitance is a preferred embodiment. Other preferred embodiments are envisioned and may be provided in correspondence with the invention. In one other preferred embodiment capacitors with different capacitances are used. In one other preferred embodiment, battery cells are used instead of capacitors. In one preferred embodiment some switching cells include battery cells and the others include capacitors.

Each capacitor 12A-n, 22A-n, 32A-n is preferably, however not illustrated in FIG. 1, arranged in an H-bridge configuration, of four semiconductor switches, such as IGBTs, each in anti-parallel connection with a diode, see FIG. 3-8. Alternatively each capacitor may preferably be arranged in a half bridge configuration. Each switching cell 11A-n, 21A-n, and 31A-n of the phase legs 10, 20, 30 are provided as modules of the same type as every other switching cell 11A-n, 21A-n, and 31A-n; having the same bridge topology, the same type of capacitor and the same type of semiconductor switches.

At the second end of each phase leg 10, 20, 30, opposite the grid connections 15, 25, and 35, each phase leg 10, 20, 30 is connected to an energy transfer circuit 40 arranged for exchanging energy between the phase legs. Each phase leg 10, 20, 30 comprises, at the second end, a respective connection 16, 26, 36 to the energy transfer circuit 30, which energy transfer circuit 40 has a corresponding respective connection terminal 41, 42, 43 to each one of the phase legs 10, 20, 30. The energy transfer circuit 40 comprises at least one energy storing element, such as a capacitor 44, and switches, or switching means, (not illustrated) by means of which the at least one energy storage element can be electrically connected to each phase leg 10, 20, 30. The energy transfer circuit 40 is arranged to selectively connect the three phase legs 10, 20, 30 electrically to transfer electrical energy to and from each phase 10, 20, 30. It is noted that the energy transfer circuit 40 comprises at least one energy storage element 44 being common to the phase legs 10, 20, 30, whereas each phase leg 10, 20, 30 comprises energy storage elements 12A-n, 22A-n, 32A-n being dedicated only to that respective phase. The phase legs 10, 20, 30 are electrically separated from each other along the line of series connected switching cells 11A-n, 21A-n, 31A-n and each leg 10, 20, 30 has a connection at the respective second end to the common energy transfer circuit to provide an energy transfer between the phase legs 10, 20, 30.

The converter arrangement 1 also comprises a controller 50 that is operatively connected to each phase leg 10, 20, 30 and to the energy transfer circuit 40, as illustrated by the dotted lines. The controller 50 is adapted to obtain measurements of the currents in each phase leg 10, 20, 30 by means of current measuring means 18, 28, 38 arranged in each phase leg 10, 20, 30 at each respective grid connections 15, 25, 35. The current measuring means 18, 28, 38 can suitably be provided by means of current transformers. The controller 50 is adapted to obtain voltage measurements of each energy storage element, the capacitors 12A-n, 22A-n, 32A-n, of the switching cells 11A-n, 21A-n, 31A-n and obtain voltage measurements of the energy storage elements 44 of the energy transfer circuit 40, for example by means of voltage meters or voltage transformers (not illustrated) and the controller 50 is further operatively connected to each switching cell 11A-n, 21A-n, 31A-n in every phase leg 10, 20, 30 and each switch of the energy transfer circuit 40 and is adapted to control the switching of each switching cell 11A-n, 21A-n, 31A-n and the switches of the energy transfer circuit 40 so that each phase leg 10, 20, 30 together with energy storage elements 44 of the energy transfer circuit provide the desired phase voltage to the transmission grid. The controller 50 is configured to employ pulse width modulation to control the switches of the switching cells of each phase leg 10, 20, 30 and the switches of the energy transfer circuit 40. The controller 50 is for example provided to control the switching cells to adjust the active and/or reactive power in a transmission line or grid, and is adapted to receive a voltage reference signal to provide such compensation. The voltage reference signal is provided by an external controller that controls an outer control loop of the converter arrangement 1, and the voltage reference signal is based on grid measurements, such as measurements of the phase voltages and currents of a transmission line from current and voltage measuring means arranged at the transmission line. The voltage reference signal provides a single voltage level for each phase to be provided during one control period.

The controller 50 is further adapted to provide a desired energy transfer by controlling the switching of the switching cells 11A-n, 21A-n, 31A-n and the energy transfer circuit 40 so that unbalanced capacitor voltages in the phase legs 10, 20, 30 are rebalanced. The controller 50 is adapted to effectuate such energy transfer without affecting the phase voltages provided to the transmission grid.

In this way, the controller 50 is adapted to control both the phase voltages and the energy transfer between the phase legs 10, 20, 30. For each control period, one single reference voltage level for each phase is used, and one single process of energy transfer is employed.

For each phase A, B, C, the controller 50 is adapted to select energy storage elements or capacitors 12A-n, 22A-n, 32A-n, 44 of the phase leg 10, 20, 30 and the energy transfer circuit 40, for each control period, and provide the desired phase voltages by controlling the corresponding switches of the cells and the energy transfer circuit, so that the desired phase voltages are provided in accordance with the voltage reference signal. The controller 50 is adapted to control the connection of some energy storage elements, or first set of energy storage elements, selected from the energy storage elements, e.g. the capacitor 12A-n, 22A-n, 33A-n, of each phase leg and the at least one energy storage element 44 of the energy transfer circuit 40, to provide the desired voltage for each phase A, B, C.

The controller 50 is also adapted to control, for each and every control period, the connection of some other energy storage elements, or second set of energy storage elements, selected from the remaining energy storage elements 12A-n, 22A-n, 33A-n of each phase leg and the at least one energy storage element 44 of the energy transfer circuit 40 to effectuate a power transfer within each phase leg 10, 20, 30 and to effectuate an energy transfer between the switching cells of each phase leg 10, 20, 30 and the energy transfer circuit 40, i.e. to especially effectuate an energy transfer between the capacitors 12A-n, 21A-n, 31A-n of each phase leg 10, 20, 30 and the capacitor, or capacitors, 44 of the energy storage circuit 40 that have not been selected for providing the respective phase voltage level of the control period.

Figure 2:
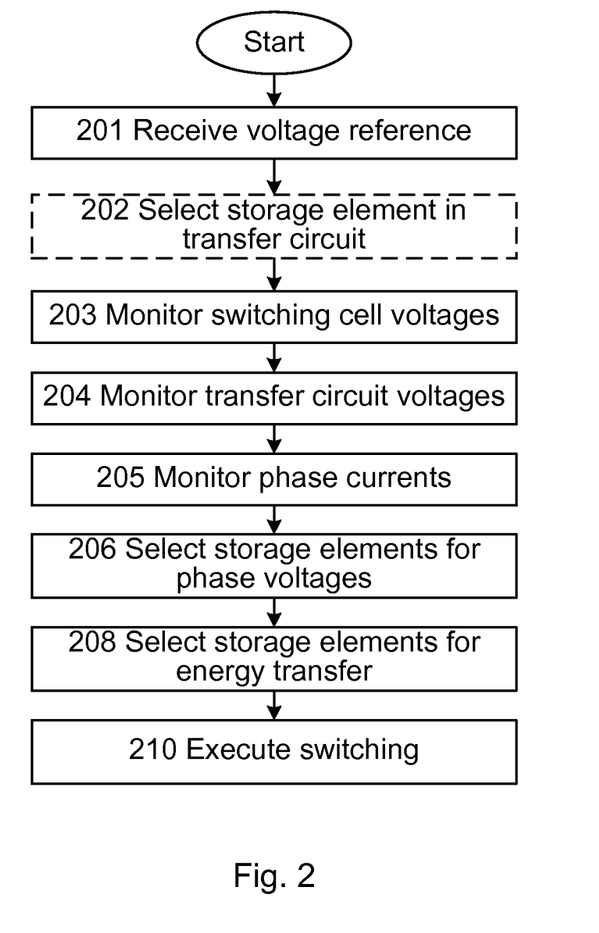
FIG. 2 illustrates a method of controlling a converter arrangement of the invention.

FIG. 2 illustrates a method performed by a converter for providing phase voltages to a transmission grid and transferring energy between at least one phase leg 10, 20, 30 of the converter and an energy transfer circuit 40 connected to the phase legs 10, 20, 30. The controller 50 is adapted to control a converter arrangement to perform the method. For this purpose, the controller 50 is provided with means for performing the method steps, which means 51-55 can be implemented as a combination of software and hardware, especially as computer program, memory and processor, which computer program when executed by means of the processor and memory perform the method steps. The controller 50 is therefore provided with means 51 for monitoring voltages, means 52 for monitoring the phase currents, means 53 for selecting energy storage elements to provide the phase voltages, means 54 for selecting energy storage elements to provide the energy transfer and means 55 for executing the switching of the switching cells and the switches of the energy transfer circuit.

Switching is provided at a switching frequency sufficiently high to provide a varying voltage of the grid frequency, in most transmission grids being 50 Hz or 60 Hz. The effective switching may for example be 2.5 kHz, and for each control period the switching provides the outputted phase voltages at each respective reference voltage level by means of the switching cells selected for that control, or switching, period.

The method starts with receiving a voltage reference level 201 to be provided to each phase A, B, C from each respective phase leg 10, 20, 30 by means of the switching cells 11A-n, 21A-n, 31A-n of each respective phase leg 10, 20, 30, and the at least one common energy storage element, capacitor 44, of the energy transfer circuit 40.

The method continues with the step of establishing the voltage level 203 of each switching cell 11A-n, 21A-n, 31A-n.

In step 204 the controller establish the voltage level for each of the at least one energy storage elements 44 of the energy transfer circuit 40.

Suitably, the respective voltage level of every energy storage element 11A-n, 21A-n, 31A-n, 44 is established in steps 203 and 204.

The method continues with monitoring the currents 205 in each phase leg 10, 20, 30, and determines the direction of the power flow during the control period for each of the phase legs 10, 20, 30. Thus, the direction of the phase currents are used to choose in which direction the energy storage elements 12A-n, 22, A-n, 32A-n of the switching cells 11A-n, 21A-n, 31A-n and the energy storage element or elements 44 of the transfer circuit 40 shall be connected so that the power is added to a capacitor if the voltage of the capacitor is below the nominal voltage and, vice versa, so that power is removed from the capacitor if the voltage of the capacitor is above the nominal voltages. Thus, by the monitoring of step 205 the direction in which each energy storage element shall be connected during the control period can be determined based on the direction of the phase current.

The method further includes selecting energy storage elements 12A-n, 22A-n, 32A-n, 44, step 206, from each phase leg 10, 20, 30 and from the energy transfer circuit 40, to provide the reference voltage levels of the phases A, B, C. Suitably, a minimum number of switching cells is selected, i.e. a minimum number of cells to provide the voltage reference level. The selection is preferably based on the voltage levels of the energy storage elements 12A-n, 22A-n, 32A-n, 44 as established in steps 203 and 204, and the reference voltage levels obtained in step 201. Preferably also, energy storage elements are selected on the basis of the direction of the power flow in the phase leg during the control period, such that energy storage elements having the highest voltage levels are selected for control periods where power is supplied from the respective phase leg 10, 20, 30 to the transmission grid, and energy storage elements having the lowest voltage levels are selected for control periods during which power is received in the respective phase leg 10, 20, 30 from the transmission grid.

Also, to obtain the desired phase voltages one of the energy storage elements are suitably only selected for being connected at a fraction of the control period, which fraction corresponds to the fraction of desired voltage contribution of the energy storage element and the actual voltage level of that energy storage element.

To exemplify a switching strategy, a reference voltage of 170 Volts may be provided by switching in a first cell having a capacitor voltage of 100 Volts for the whole switching period and switching in a second cell having a capacitor voltage of 100 Volts for 70% of the switching period. If the voltage levels deviate from a nominal voltage of 100 Volts, the switching is adjusted. Thus, to provide a voltage of 170 Volts, a first switching cell having a capacitor voltage of 98 volts can be switched in for the full switching period together with switching in a cell having a capacitor voltage level of 97.5 Volts for 74% of the switching period to add up the required 170 Volts (since 98*1+97.5*0.74 is approximately 170 Volts). Thus, from measured capacitor voltages of the switching cells, a number of the switching cells of each phase leg are selected to synthesize the reference voltage of each phase.

The method continues with selecting, step 208, the switching cells 11A-n, 21A-n, 31A-n to be used for transfer of energy between each phase leg 10, 20, 30 and the energy transfer circuit 40. The selection 208 is based on the established voltage levels of the energy storing elements 12A-n, 22A-n, 32A-n, of the at least one energy storage element 44 and the direction of the phase currents or phase power flow. In step 208 the selection is made from remaining energy storage elements 12A-n, 22A-n, 32A-n, 44, i.e. among those energy storage elements that have not been selected, in step 206, for providing the phase voltages. Preferably, out of the remaining switching cells 11A-n, 21A-n, 31A-n of each phase leg 10, 20, 30 and switches of the energy transfer circuit 40, those switching cells that are used for the remaining energy storage elements 12A-n, 22A-n, 32A-n, 44 having voltage levels that deviate the most from the nominal voltage levels should be selected. In an embodiment, the controller 50 is adapted to select those energy storage elements that have the largest deviation primarily, so that these storage elements have the largest likelihood of being subjected to the energy transfer.

In this step 208 of selecting energy storage elements 12A-n, 22A-n, 32A-n, 44 for energy transfer, the controller 50 matches energy storage elements 12A-n, 22A-n, 32A-n, 44 including determining the connection of one or more reversely so that the total voltage output of the energy storage elements selected for energy transfer provides a zero voltage output. In this way energy storage elements 12A-n, 22A-n, 32A-n, 44 having voltage levels above the nominal voltage are selected to be oppositely connected compared to energy storage elements 12A-n, 22A-n, 32A-n, 44 having voltage levels below the nominal voltage level, whereby energy is transferred between these energy storage elements 12A-n, 22A-n, 32A-n, 44 so that the deviations from the nominal voltage levels decrease for both these groups of energy storage elements 12A-n, 22A-n, 32A-n, 44. To provide a zero voltage output the connection time period for one or more energy storage elements is suitably adjusted to a fraction of the control period. This fraction of the control period is selected equal to the fraction of a desired voltage to the measured voltage level or levels. Thus, if for example a storage element having a voltage level of 105 Volts is matched with a storage element having a voltage level of 97 Volts, i.e. one is connected in the opposite direction, so that 105 Volts is matched with −97 Volts, then −97 Volts can be applied during the whole control period whereas 105 Volts is applied during a fraction of 97/105 of the control period, so that the voltage contributions equals out each other.

In an embodiment, switching cells 11A-n, 21A-n, 31A-n of each phase leg and the switches of the energy transfer circuit 40 having energy storage elements 12A-n, 22A-n, 32A-n, 44 having voltages that deviate a certain threshold are selected for the energy transfer. For example, the threshold may be 3%, 4% or 5%. The selection is made from energy storage elements that are available for each phase, so that from a specific phase A the selection is made from both the energy storage elements 12A-n of that phase leg 10 and the energy storage element or elements 44 available for that phase in the energy transfer circuit 40 during the control period in question. Note that the same energy storage elements 44 of the energy transfer circuit may be selected for connection to more than one phase A, B, C during the control period in question. For example, an energy storage element 44 of the energy transfer circuit 40 may be selected to be positively connected to one phase (e.g. A) during a control period and negatively connected to another phase (e.g. B) during the same control period. The voltages are combined for the energy transfer so that the net effect to the transmission grid becomes zero volts, thus so that the phase voltages are not affected by the energy transfer.

The voltages combined for providing the phase voltages, as selected in step 206, are also selected from the energy storage elements 12A-n, 22, A-n, 32A-n of each respective phase leg 10, 20, 30 and the energy storage element or elements 44 of the energy transfer circuit 40 that are available for each specific phase A, B, C during the control period in question, and thus the energy storage element or elements 44 of the energy transfer circuit 40 may for a specific control period be connected to more than one phase A, B, C, and may be connected in opposite direction to two different phases A, B, C during a control period.

The last step 210 consists of executing switching of the switching cells 11A-n, 21A-n, 31A-n of each phase and the switches of the energy transfer circuit 40 in accordance with the selections made for providing the phase voltages and for transferring energy, wherein the determined direction of the phase currents is used as a basis for the establishing the direction of connection of the energy storage elements 12A-n, 21A-n, 31A-n, 44.

An energy transfer circuit 40 that includes a number of energy storage elements, or capacitors, can be used, for example an energy transfer circuit 40 wherein the energy storage elements can be serially connected to provide a higher voltage level. The energy transfer circuit 40 may be configured to selectively allow serial connection of a varying number of energy storage elements for the respective phase legs 10, 20, 30. The voltage of the three phases A, B, C varies and for a control period one phase having a higher voltage may get a larger number of serially connected energy storage elements than a phase wherein the voltage is lower during that same control period. Such an embodiment will be more described in FIG. 7. Varying the number of serially interconnected energy storage elements between the control periods for different phase legs is advantageous by making it possible to limit the total number of energy storage elements in the energy transfer circuit 40. The method may include a step 202 of selecting storage elements in the energy transfer circuit that should be available for each phase leg during the control period. Step 202 may be performed between step 201 and 203. In such a step a selection of which storage elements that are common for the phase legs 10, 20, 30 during the control period may be performed, and also which energy storage elements that are dedicated to a specific phase leg 10, 20, 30 during the control period.

FIGS. 3-8 illustrate embodiments of topologies suitable for implementing the converter arrangement of the invention. For clarity, the number of reference numerals has been limited in the figures and mainly one phase is described in each FIG. 3-8. The indication of "dotted" lines as connections between elements indicates that the number of elements can be varied. As in FIG. 1, the dotted lines between switching cells 11B and 11n indicate that a number of switching cells 11A-n can be added in each phase leg 10. For all phase legs illustrated, the number of switching cells is more than one. Also, the number of capacitors (or energy storage elements) of the energy transfer circuit 40 can be more than one, and the number of H-bridge switching cells of the energy transfer circuit 40 of FIG. 7 can be more than the one illustrated in each delta connection.

Figure 3:
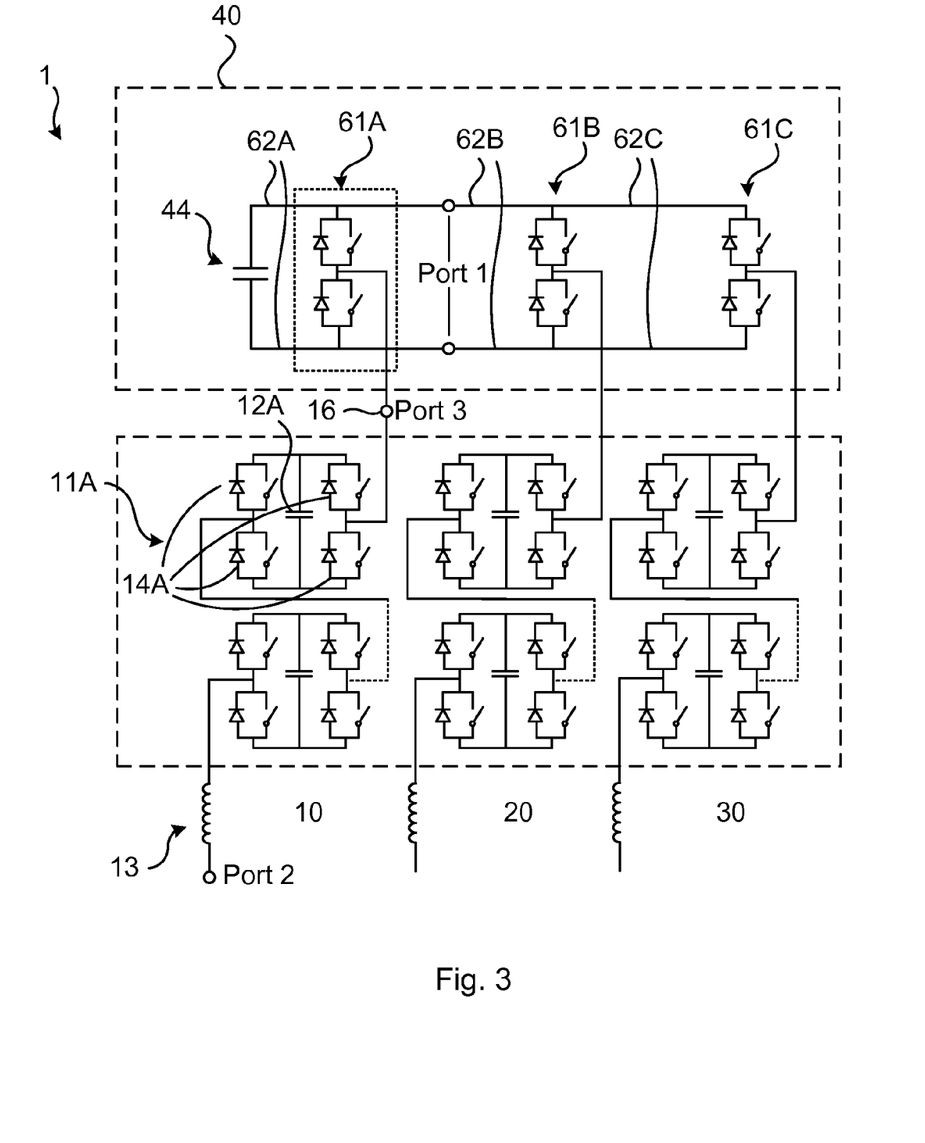
FIG. 3 illustrates an embodiment of a converter topology according to the invention.

FIG. 3 illustrate an embodiment wherein each series connected switching cell 11A of each phase leg 10, 20, 30 is a full H-bridge cell comprising a capacitor, as energy storage element 12A, and four switches 14A. For reasons of clarity, as indicated above, only one switching cell 11A of the first phase leg 10 is indicated in the figure, each phase leg 10, 20, 30 being identical. The energy transfer circuit 40 comprises one capacitor 44 and a respective set of two switching elements 61A, 61B, 61C for selectively connecting one of the phase legs 10, 20, 30 to the capacitor 44, either in positive or negative direction. At one first end, port 2, each phase leg 10, 20, 30 comprises a phase connection that includes a coil 13 being adapted for connecting to the corresponding phase of a transmission grid. At the opposite second end, port 3, each phase leg 10, 20, 30 is provided with a connection to the energy transfer circuit 40. "Port 2" indicates the connection to the phase and "port 3" indicates the energy transfer connection to the energy transfer circuit 40. The energy transfer circuit 40 comprises a single capacitor as energy storage element 44, to which each set of switches 61A, 61B, 61C is connected by means of DC link pairs 62A, 62B, 62C, one DC link in each pair to a respective side of the energy storage element 44. Each pair of DC links provides an electrical connection for energy transfer between each respective phase and the other phases and the energy storage element 44, which is indicated as "port 1".

Figure 4:
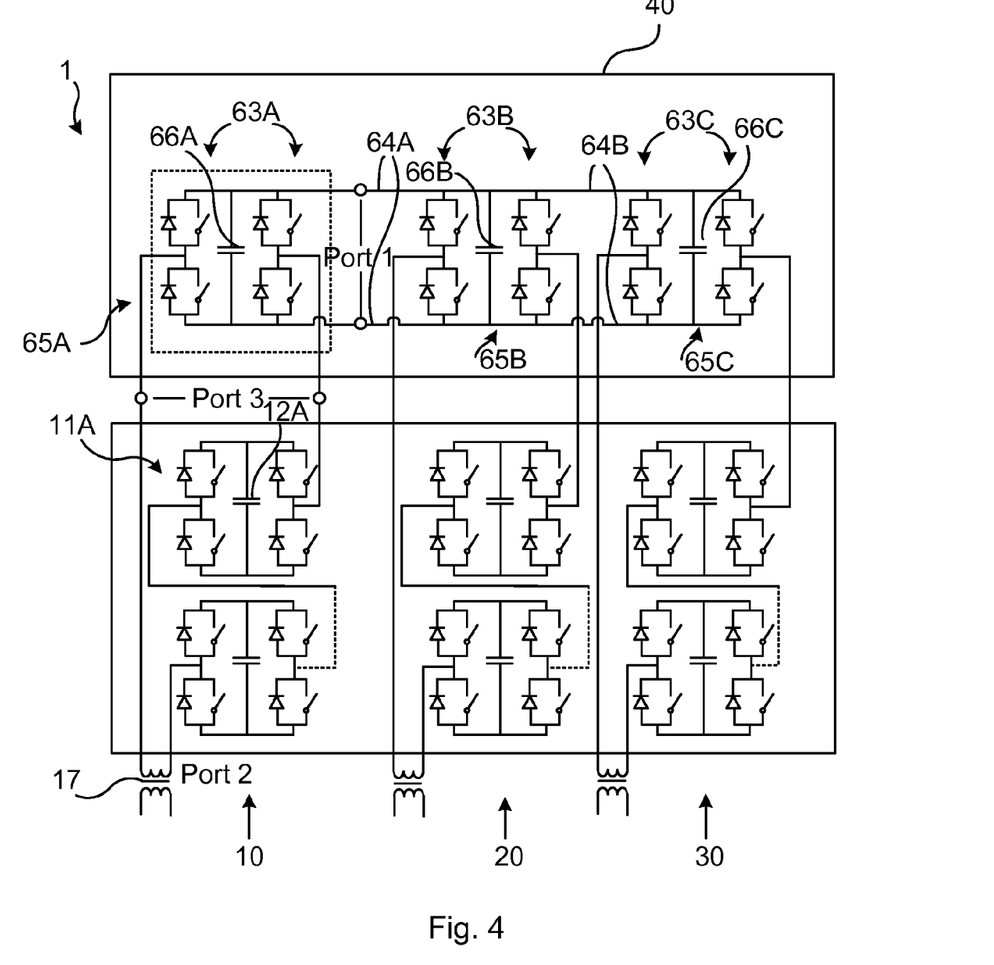
FIG. 4 illustrates an embodiment of a converter topology according to the invention.

FIG. 4 illustrates a topology being similar to the topology of FIG. 3. The differences being that each phase leg 10, 20, 30 has a phase connection at port 2 in the form of a transformer 17 winding, the other side of the transformer 17 winding being connected to the phase leg 10, 20, 30 via respective switching means 63A, 63B, 63C in the energy transfer circuit 40. As in FIG. 3, each switching cell 11A of the phase legs is a full H-bridge cell comprising a capacitor 12A as energy storage element. The energy transfer circuit 40 comprises three full H-bridge storage cells 65A, 65B, 65C, each comprising the switching means for each respective phase leg 63A, 63B, 63C with its own capacitor 66A, 66B, 66C. The storage cells 65A, 65B, 65C of the energy transfer circuit 40 being connected on both sides of the respective capacitor 66A, 66B, 66C with the other capacitors 66A, 66B, 66C by means of DC links 64A, 64B that provides electrical connections for transferring energy between the capacitors 66A, 66B, 66C of the energy transfer circuit 40 and between the phase legs 10, 20, 30. Each full H-bridge storage cell 65A, 65B, 65C being connected on a first side to the respective phase leg 10, 20, 30 and on the other side to the respective transformer 17 winding for that phase, so that the phase leg and transformer winging may selectively be connected to either side of the energy storage elements 66A-C by means of the switches 63A-C of the H-bridge storage cell 65A-C.

Figure 5:
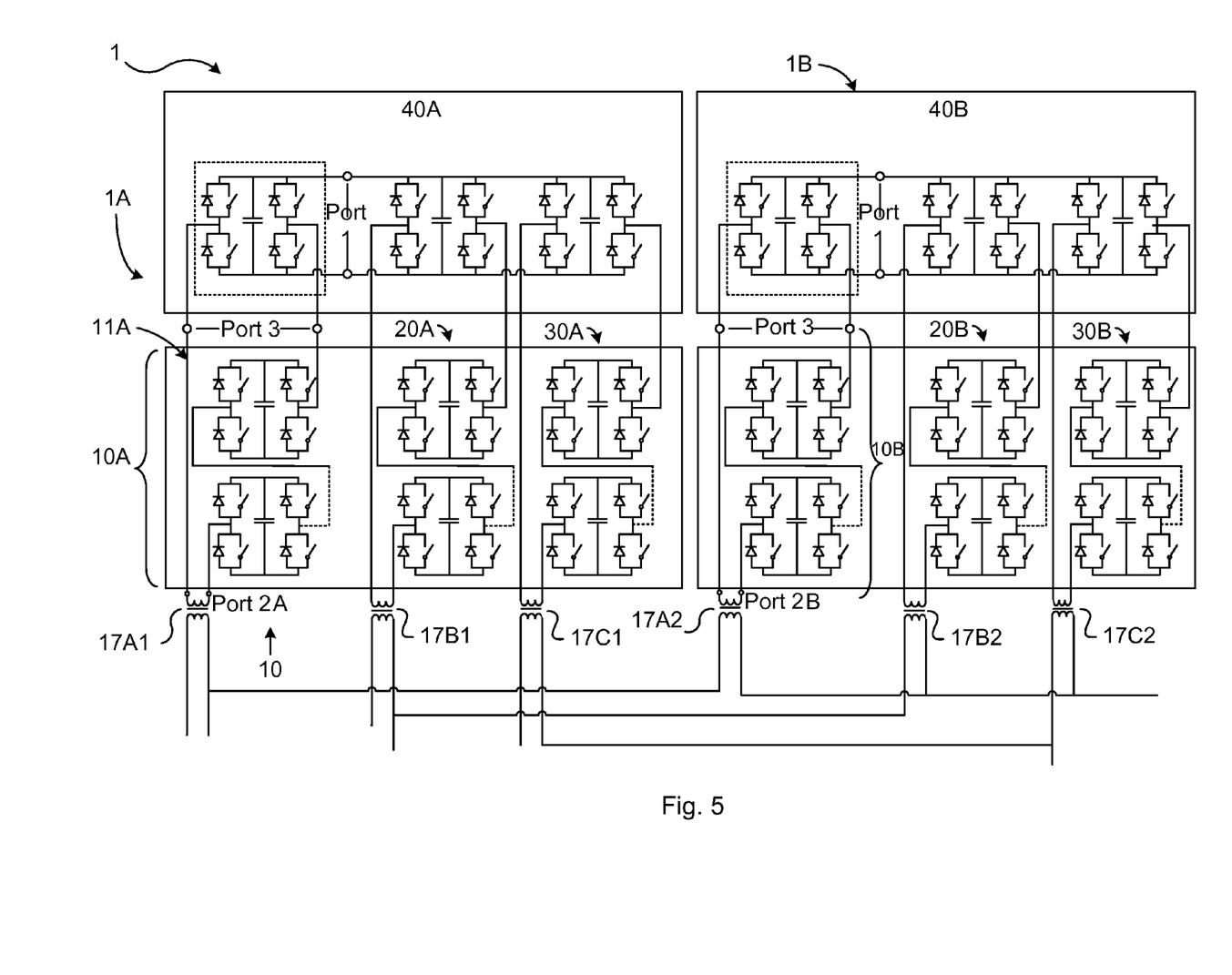
FIG. 5 illustrates an embodiment of a converter topology according to the invention.

FIG. 5 illustrates an embodiment comprising a topology consisting of two converters, sub-converters 1A and 1B, of the type illustrated in FIG. 4. Each phase leg 10, 20, 30 having two series connected sub-legs 10A, 10B each sub-leg 10A, 10B belonging to a respective one of the sub-converters 1A, 1B. Each pair of sub-legs 10A, 10B being connected in series by a transformer and form a composite phase leg 10. Each sub-converter 1A, 1B comprises an energy transfer circuit 40A, 40B arranged for enabling an energy transfer between the phase legs 10A, 20A, 30A of the first sub-converter 1A and between the phase legs 10B, 20B, 30B of the second sub-converter 1B, respectively. Thus, each sub-leg 10A-B, 20A-B, 30A-B being separated from the other sub-legs along the sub-leg, and comprises a connection at one end to the respective energy transfer circuit 40A, 40B that provides a port 3 for energy transfer to the sub-legs of the other phases A, B, C of that sub-converter 1 and 1B, respectively. As in FIG. 4, each energy transfer circuit 40A, 40B comprises H-bridge cells interconnected by DC links. This converter can be controlled in the same way as the converters 1 of FIGS. 1, 3 and 4 in that the voltage for each phase, for example phase A, is provided by selecting the energy storage elements of the first and the second sub-leg 10A, 10B (for that phase) and the storage elements of both energy transfer circuits 40A, 40B, since all energy storage elements of both energy transfer circuits 40A, 40B are common to all the phase legs 10, 20, 30. Each phase connection comprises two interconnected transformers, at port 2A and port 2B, respectively.

In the embodiments described in FIGS. 3-4 and 6-7 the phase legs 10, 20, 30 are separated from each other along each leg, but configured for energy transfer by being interconnected via the energy transfer circuit 40. In the embodiment of FIG. 5 the phase legs 10, 20, 30 are also separated from each other but are configured for energy transfer by means of an intermediate energy transfer circuit 40A dividing each phase leg 10, 20, 30 into a first 10A, 20A, 30A and a second 10B, 20B, 30B sub leg. At the ends of the second sub legs 10A, 20A, 30A the phase legs can exchange energy by means of the energy transfer circuit 40B. The two sub converters 1A, 1B can be seen as modules and further modules of a third, fourth or fifth (and so on) sub converters can be added to provide higher voltages, all sub converter modules 1A, 1B serially connected by means of transformers 17A1, 17B1, 17C1, 17A2, 17B2, 17C2 to the transmission grid.

Figure 6:
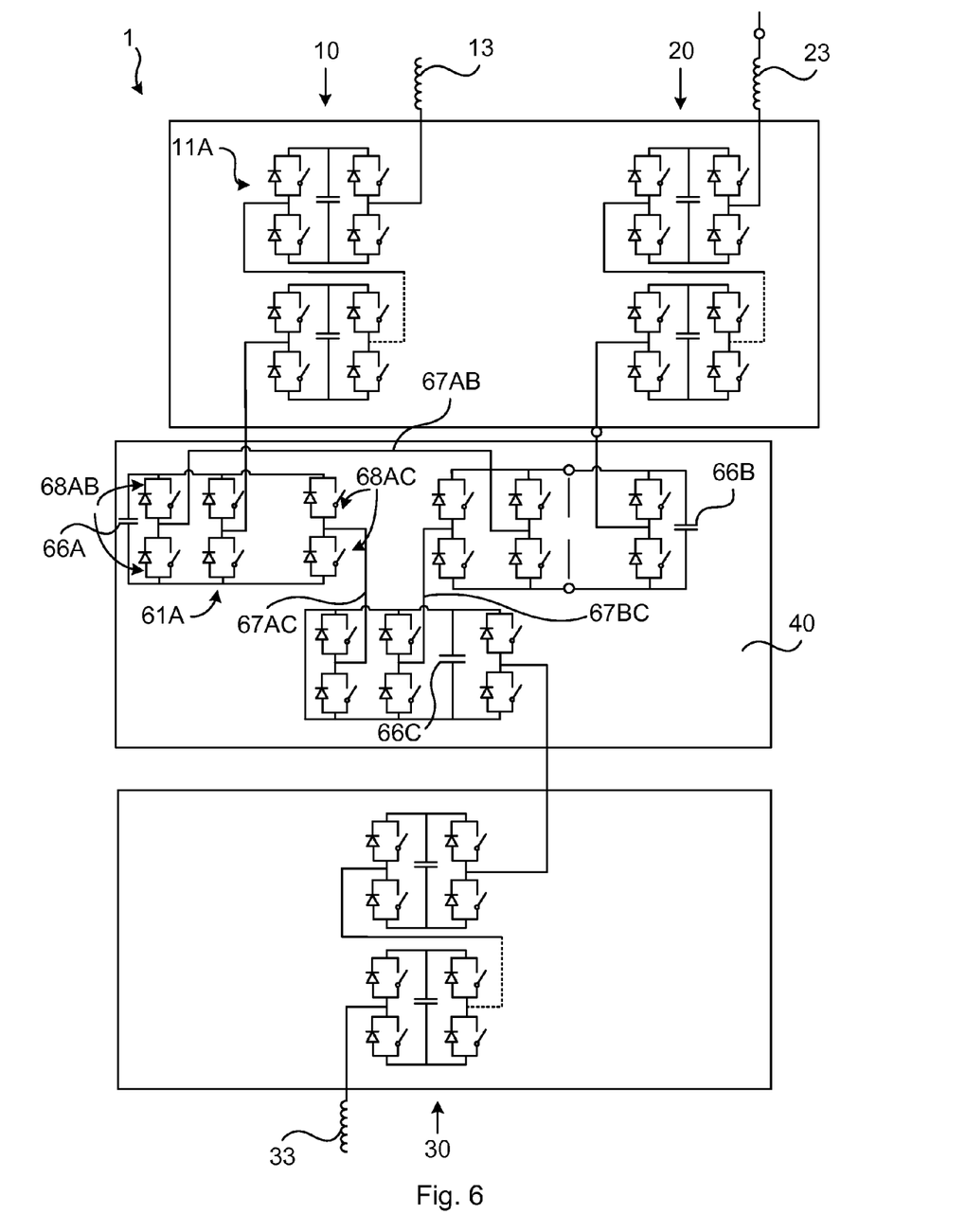
FIG. 6 illustrates an embodiment of a converter topology according to the invention.

FIG. 6 illustrates a converter having the same type of phase legs 10, 20, 30 as in FIG. 3. Thus, each phase leg 10, 20, 30 comprising series connected switching cells 11A, wherein each switching cell 11A is a full H-bridge cell having a capacitor as energy storage element. Each phase leg 10, 20, 30 also has a phase connection that includes a coil 13, 23, 33.

However, the energy transfer circuit 40 of FIG. 6 have a different topology compared to the topology of the energy transfer circuit of FIG. 3. The energy transfer circuit 40 comprises three sets of two switches, one set of switches 61A for each phase leg (for clarity only indicated for one phase 10), by means of which the phase leg 10 can be connected to a respective one of the energy storage elements 66A, 66B, 66C of the energy transfer circuit 40. Each one of these respective energy storage elements 66A, 66B, 66C is dedicated to a corresponding one of the phase legs 10, 20, 30 by being arranged at the input respective of the phase leg 10, 20, 30 and connectable to the phase leg 10, 20, 30 by means of the first set of switches 61A. The energy transfer circuit 40 also includes delta connections 67AB, 67BC, 67AC arranged in a delta topology to connect any one of the phase legs 10, 20, 30 and the dedicated energy storage elements 66A, 66B, 66C of another phase leg 10, 20, 30. For each one phase leg 10, the energy transfer circuit 40 includes two sets of switches 68AB, 68AC for selectively connecting the phase leg 10 to a respective dedicated energy storage element of a first one 20 and a second one 30 of the other phase legs 20, 30, via a corresponding one 67AB, 67AC of the delta connections. By means of these delta connections 67AB, 67AC, and the corresponding switches 68AB, 68AC a first phase leg 10 is adapted to be selectively connected to the energy storage elements that are dedicated to the other phase legs 20, 30. Thus, each phase leg 10, 20, 30 has a dedicated energy storage element 66A, 66B, 66C to which it is directly connectable by means of the first set of switches 61A (for phase leg 10) for that phase leg 10. The energy storage elements 66B, 66C that are dedicated to the other phase legs B, C can be connected to the first phase leg 10 by means of the set of switches 61A that connects the phase leg 10 to its dedicated energy storage element 66A, of the energy transfer circuit 40, together with the respective set of switches 68AB, 68AC of the delta connections 67AB, 67AC that connect the phase leg 10 to the energy storage element 66B, 66C dedicated to each of the other phase legs 20, 30.

The converter of FIG. 6 is controlled in a different way compared to the converters of FIGS. 1, 3, 4, 5 in that the number of available energy storage elements of the energy transfer circuit 40 varies, i.e. available for a respective phase leg. Especially the energy storage elements of the energy transfer circuit 40 that is available for selection for a respective phase leg 10, 20, 30 is determined for each control period. Preferably, the phase A, B, C for which the reference voltage level is the lowest in a control period is selected and the dedicated energy storage element for the corresponding phase leg 10, 20, 30 is selected to be common for all phases for that control period. Thus, in a preferred embodiment for controlling a converter having the topology illustrated in FIG. 6, if the third phase C has the lowest reference voltage level during a control period, the dedicated energy storage element 66C of the corresponding phase leg 30, i.e. the energy storage element dedicated to the third phase leg 30 that is controlled to provide the voltage level for the third phase C, is selected to be common for all phase legs 10, 20, 30 for that control period. When the energy storage element 66C is selected to be common, the delta connection 68AB between the other two phase legs, i.e. the first 10 and the second 20 phase leg is disconnected for that control period. When selecting the energy storage elements for providing the phase voltages and the energy transfer, the selection for the third phase leg 30 includes the energy storage elements (32A-n of FIG. 2) for the switching cells of that phase leg 30 and only the energy storage element 66C being dedicated to that phase leg 30. Whereas, for the first 10 and second 20 phase leg, the energy storage elements of each phase leg 10, 20 is selectable for that phase together with the respective energy storage element 66A, 66*b*, respectively, of the energy transfer circuit 40 that is dedicated to the phase 10, 20 in question and together with the common energy storage element 66C of the third phase 30. When controlling the converter of FIG. 6, a step of selecting a common energy storage element of the energy transfer circuit, which energy storage element is common for all phases during the control period, is included between steps 201 and 203 in the method of FIG. 2. Such a step 202 (between steps 201 and 203) also includes determining the available energy storage elements for each phase, i.e. available during the control period, which determining is made in accordance with the selection of the common storage element. The phase having the lowest reference voltage level is selected to have the common energy storage element in the delta connected energy transfer circuit since the available voltage level for that phase being lower than for the other phase legs, which in the illustrated topology of FIG. 6 means that the voltage level being lowered by the voltage level of one capacitor.

Figure 7:
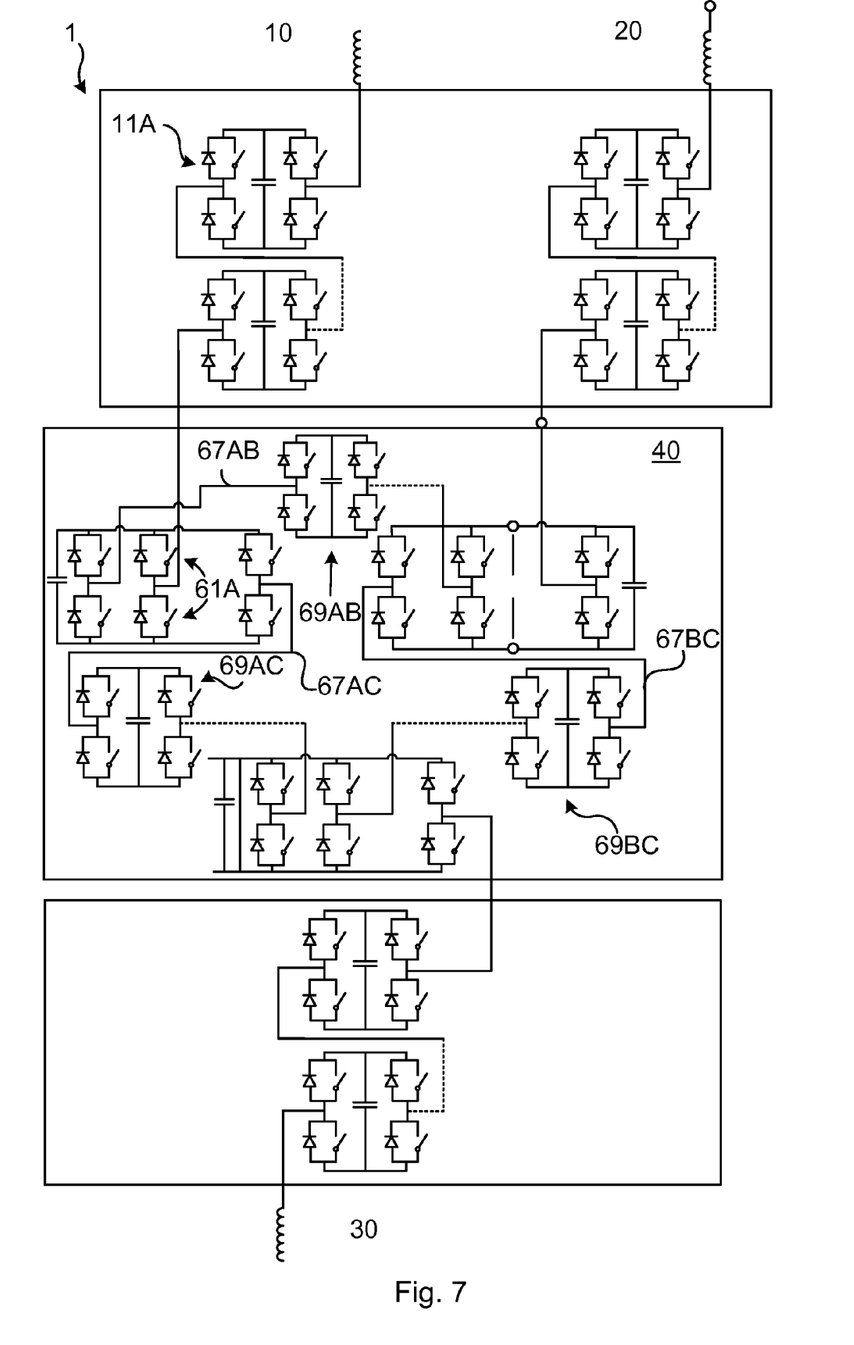
FIG. 7 illustrates an embodiment of a converter topology according to the invention.

FIG. 7 illustrates a further embodiment of the topology of FIG. 6. In addition to the topology of FIG. 6, the delta connections of the energy transfer circuit 40 of FIG. 7 each include H-bridge switching cells 69AB, 69BC, 69AC, each switching cell including a capacitor as energy storage element. Thus, when a common energy storage element is selected in one phase leg in the topology of FIG. 6, the other phase legs have access to a voltage level being higher by a single capacitor voltage level, the selection of a common energy storage element in the topology of FIG. 7 provides that the other phase legs have access to voltage levels being higher by the a voltage corresponding to the number of H-bridge switching cells plus one. Thus, if the number of H-bridges in each delta connection is k, the difference in maximum voltage level is k+1 capacitor voltages. Thus, the inclusion of H-bridge switching cells with capacitors in the delta connections 67AB, 67BC, 67AC adds voltage levels and energy transfer capacity to the energy transfer circuit 40.

Figure 8:
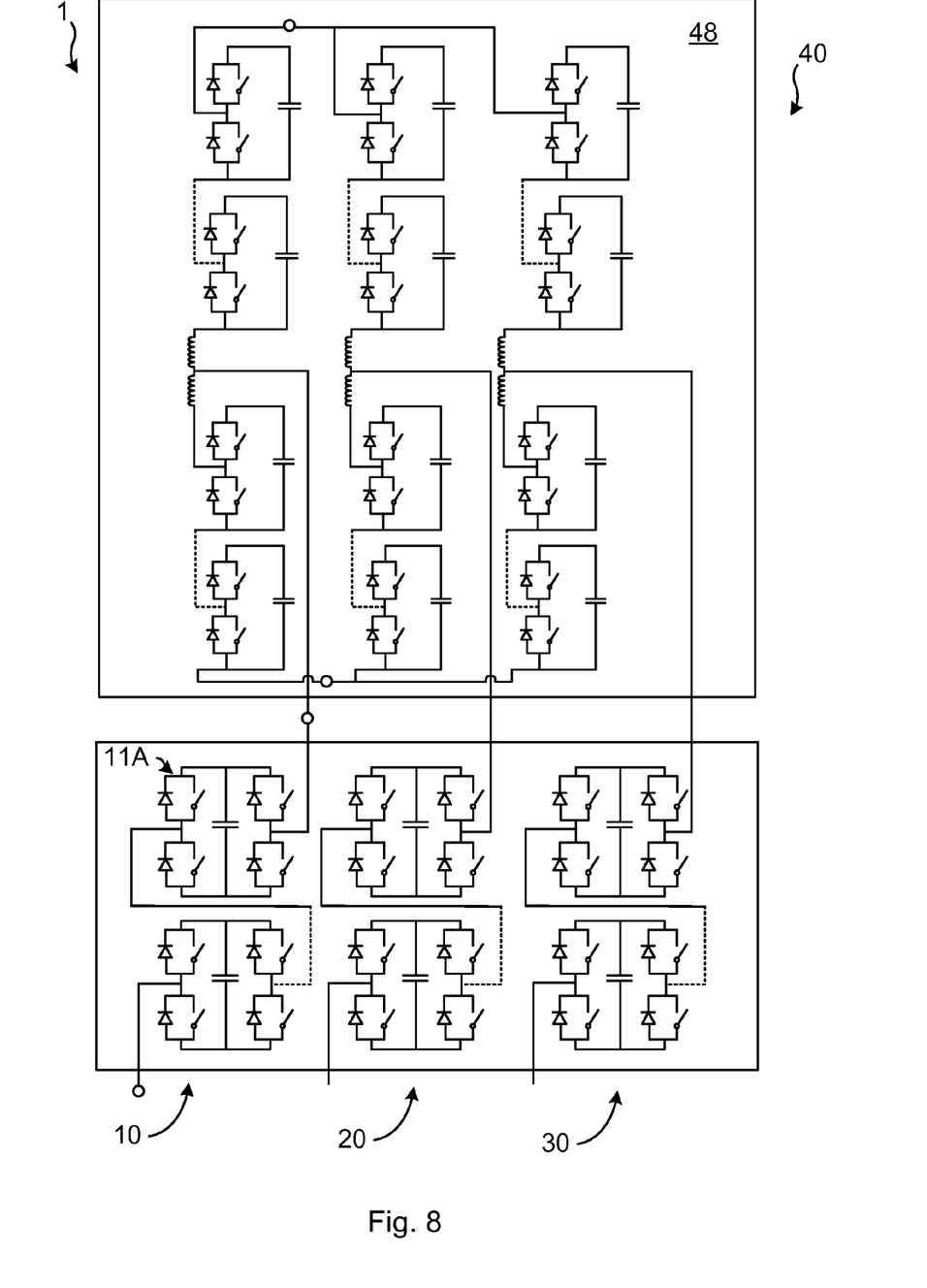
FIG. 8 illustrates an embodiment of a converter topology according to the invention.

FIG. 8 illustrates a converter having three phase legs 10, 20, 30 with H-bridge switching cells as previously described in FIG. 3. The energy transfer circuit 40 consists of an M2LC converter 48.

Thus, with reference to FIGS. 1-8, a converter arrangement 1 and a method of controlling a three-phase converter arrangement connected to a transmission grid has been described. The converter arrangement 1 comprises three phase legs 10, 20, 30 and an energy transfer circuit 40. The method comprises providing a varying respective output phase A, B, C voltage to the transmission grid by selecting 206 energy storage elements 12A-n, 21A-n, 31A-n, 44 of both the phase legs 10, 20, 30 and the energy transfer circuit 40 and connecting 210 the selected energy storage elements 12A-n, 21A-n, 31A-n, 44 to the transmission grid output 15, 25, 35. The method further comprises selecting 208 energy storage elements 12A-n, 21A-n, 31A-n, 44 for performing a transfer of energy between the energy storage elements 12A-n, 21A-n, 31A-n, 44 during the control period.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling a three-phase converter arrangement connected to a transmission grid, which converter arrangement comprises three phase legs and an energy transfer circuit, each phase leg comprising a plurality of switching cells arranged in series, each switching cell comprises an energy storage element being selectively connectable to the respective phase leg, the energy transfer circuit comprising at least one energy storage element being selectively connectable to each one of the phase legs, the method comprising the steps of:
 providing a varying respective output phase voltage to the transmission grid by selecting energy storage elements and connecting the selected energy storage elements to the output for a number of successive control periods on the basis of a voltage reference signal, wherein the selecting is performed for each control period to provide an adjustment of the output phase voltages for each control period, and the selecting for each phase voltage is made among the energy storage elements of the corresponding phase leg and the at least one energy storage element of the energy transfer circuit; and
 selecting energy storage elements for performing a transfer of energy in each phase leg between the energy storage elements during the control period, the selection for performing the energy transfer being made for each phase leg among the energy storage elements of that phase leg and of the energy transfer circuit, and connecting the energy storage elements selected for providing an adjustment of the phase voltages, and the energy storage elements selected for performing a transfer of energy, to the output,
 wherein the energy transfer circuit is configured to exchange energy between the three phase legs of the three-phase converter arrangement, the three phase legs having a first connection at a first end of each phase leg to the transmission grid, and a second connection at a second end, opposite to the first end, of each phase leg to the energy transfer circuit.

2. The method for controlling a converter arrangement according to claim 1, further comprising the step of monitoring the voltage level of each energy storage element, wherein the selecting of energy storage elements for the energy transfer is based on their voltage levels.

3. The method for controlling a converter arrangement according to claim 2, wherein the selecting for providing the output phase voltages is based on the monitored voltage levels.

4. The method for controlling a converter arrangement according to claim 3, wherein the selecting of energy storage elements for energy transfer in each phase leg includes matching the energy storage elements on the basis of their voltage levels to provide a zero voltage contribution for the control period to the output phase voltage from the energy storage elements that are selected for the energy transfer.

5. The method for controlling a converter arrangement according to claim 2, wherein the selecting of energy storage elements for energy transfer in each phase leg includes matching the energy storage elements on the basis of their voltage levels to provide a zero voltage contribution for the control period to the output phase voltage from the energy storage elements that are selected for the energy transfer.

6. The method for controlling a converter arrangement according to claim 5, wherein said matching includes selecting a fraction of the control period for the connection of at least one of the selected energy storage elements, so that the voltage contributions of the energy storage elements are equalized.

7. The method for controlling a converter arrangement according to claim 6, wherein said fraction of the control period is equal to the fraction of the desired voltage level in relation to the voltage level of the at least one of the selected energy storage elements.

8. The method for controlling a converter arrangement according to claim 1, wherein the selection for performing the energy transfer is made among those energy storage elements that are not selected to provide the respective output phase voltages during the control period.

9. The method for controlling a converter arrangement according to claim 1, further including receiving a voltage reference signal indicating an output voltage level for each phase for each the control period, the selecting for providing the output phase voltages being based on the voltage reference signal.

10. The method for controlling a converter arrangement according to claim 9, which converter arrangement comprises an energy storage circuit comprising a plurality of energy storage elements, the method further includes restricting the possibility to select at least one of the energy storage elements of the energy storage for at least one phase during the control period when selecting energy storage elements for providing each output phase voltage and when selecting energy storage elements for energy transfer.

11. The method for controlling a converter arrangement according to claim 1, wherein the step of selecting energy storage elements for performing a transfer of energy further comprises:
 selecting energy storage elements from those energy storage elements that are not selected to provide the respective output phase voltages during the control period in the step of providing a varying respective output phase voltage to the transmission grid, and
 selectively connecting the currently selected energy storage elements of the energy transfer circuit to the currently selected energy storage elements of one or more phase legs so that energy transfers are performed among three phase legs through the energy transfer circuit, and the energy transfers provide a total voltage output to each phase at an essentially zero voltage level for the selected control periods.

12. A converter arrangement for a three-phase AC transmission grid comprising three phase legs, each phase leg comprising a plurality of switching cells connected in series, each switching cell comprising an energy storage element and semiconductor switches arranged to selectively connect the energy storage elements to the respective phase of the AC transmission grid,
 wherein the converter is adapted to provide a voltage to each phase of the transmission grid at a respective reference voltage level for successive control periods, wherein the voltage applied is provided by combining a number of energy storage elements during each control period to synthesize each phase voltage at the respective reference voltage level, and
 wherein the voltage reference specifies a single voltage level for each phase during each of the control periods, further comprising an energy transfer circuit comprising at least one energy storage element and comprising a first, a second and a third phase connection, each being connected to a respective one of the three phase legs, and the converter arrangement being configured to selectively connect each of the three phase legs to the energy transfer circuit, wherein for each phase said converter arrangement is adapted to select among the energy storage elements of the energy transfer circuit and of the phase leg when providing the phase voltages, and wherein the converter arrangement is further adapted to transfer energy between energy storage elements of each phase leg and the at least one energy storage element of the energy transfer circuit during the control periods, with energy storage elements that remain after the selection to provide the phase voltage, the transfer includes performing a matching among these remaining energy storage elements, and connecting the energy storage elements in selected directions, so that the energy transfer provides a total voltage output to each phase at an essentially zero voltage level for the selected control periods, wherein the energy transfer circuit is configured to exchange energy between the three phase legs of the three-phase converter arrangement, the three phase legs having a first connection at a first end of each phase leg to the transmission grid, and a second connection at a second end, opposite to the first end, of each phase leg to the energy transfer circuit.

13. The converter arrangement according to claim 12, wherein the energy transfer circuit comprises one capacitor and three sets of two switches, each set of switches being connected to the capacitor and a respective phase leg and arranged to selectively connect the respective phase leg to the capacitor.

14. The converter arrangement according to claim 12, wherein the energy transfer circuit comprises three H-bridge switching cells, each one connected to a respective one of the phase legs, and wherein the capacitors of the three H-bridge switching cells are interconnected by means of a DC link on both sides of the capacitors.

15. The converter arrangement according to claim 12, wherein the energy transfer circuit is arranged in a delta configuration comprising three delta connections between the phase legs.

16. The converter arrangement according to claim 15, wherein each delta connection comprises at least one energy storage element and a switch configured to selectively connect the energy storage element to the delta connection.

17. The converter arrangement according to claim 15, wherein each delta connection comprises at least one energy storage element and a switch configured to selectively connect the energy storage element to the delta connection, each delta connection comprising energy storage elements and the switch being arranged in an H-bridge.

18. The converter arrangement according to claim 12, wherein the energy storage elements and switch of the energy transfer circuit are arranged in an M2LC converter topology.

19. The converter arrangement according to claim 12, the phase connection of each phase leg comprising a transformer, each phase leg connected directly to a first winding of the transformer, each phase leg connected at its other end to the first winding of the transformer via the energy transfer circuit, the second winding of the transformer being arranged for connection to the transmission grid.

20. The converter arrangement according to claim 12, wherein each phase leg consists of a first and a second sub-leg, wherein the energy transfer circuit is connected to one respective end of the second sub-legs, the converter arrangement further includes a second energy transfer circuit connected to a respective end of the first sub-legs, each sub-leg being connected via the respective energy transfer circuit to a first winding of a respective transformer that provides a phase connection for each sub-leg, the second winding of the two sub-leg transformers of each phase leg being serially connected and forms a connection for a respective phase of the transmission grid.

* * * * *